US012627695B1

(12) United States Patent
Hsu et al.

(10) Patent No.: US 12,627,695 B1
(45) Date of Patent: May 12, 2026

(54) MALWARE DETECTION USING GENERATIVE ARTIFICIAL INTELLIGENCE AND THREAT KNOWLEDGE DATABASE

(71) Applicant: VicOne Corporation, Tokyo (JP)

(72) Inventors: Shih-Han Hsu, Taipei (TW); Chih-Wei Su, Taipei (TW); Wei-Jen Chang, Taipei (TW)

(73) Assignee: VicOne Corporation, Tokyo (JP)

( * ) Notice: Subject to any disclaimer, the term of this patent is extended or adjusted under 35 U.S.C. 154(b) by 126 days.

(21) Appl. No.: 18/762,379

(22) Filed: Jul. 2, 2024

(51) Int. Cl.
*H04L 9/40* (2022.01)
*H04W 4/44* (2018.01)

(52) U.S. Cl.
CPC ...... *H04L 63/1425* (2013.01); *H04L 63/1441* (2013.01); *H04W 4/44* (2018.02)

(58) Field of Classification Search
CPC ... H04L 63/1425; H04L 63/1441; H04W 4/44
See application file for complete search history.

(56) References Cited

U.S. PATENT DOCUMENTS

| | | | | |
|---|---|---|---|---|
| 12,348,545 | B1 * | 7/2025 | Parikh | G06F 9/455 |
| 2020/0314118 | A1 * | 10/2020 | Levin | H04L 63/1425 |
| 2022/0277075 | A1 * | 9/2022 | Cummings | H04L 67/51 |
| 2024/0073229 | A1 * | 2/2024 | Sivaswamy | H04L 63/1416 |
| 2024/0323205 | A1 * | 9/2024 | Kishikawa | H04L 63/1416 |
| 2024/0326590 | A1 * | 10/2024 | Van Valer | B60K 28/063 |
| 2024/0402334 | A1 * | 12/2024 | Jain | G01S 13/931 |
| 2024/0404296 | A1 * | 12/2024 | Sah | G06V 20/58 |
| 2025/0016185 | A1 * | 1/2025 | Han | G06F 21/56 |
| 2025/0267343 | A1 * | 8/2025 | George | H04N 21/41422 |

OTHER PUBLICATIONS

Zhang et al., "Many-Objective Optimization Based Intrusion Detection for in-Vehicle Network Security," IEEE Transactions on Intelligent Transportation Systems Year: 2023 | vol. 24, Issue: 12 | Journal Article | Publisher: IEEE.*
Sathiaseelan et al., "Application AI-Powered Cybersecurity for Electric Motor vehicles: Real-Time Intrusion Prevention Using Deep Learning Models in In-Vehicle Networks," 2025 IEEE 7th International Conference on Computing, Communication and Automation (ICCCA) Year: 2025 | Conference Paper | Publisher: IEEE.*

* cited by examiner

*Primary Examiner* — Roderick Tolentino
(74) *Attorney, Agent, or Firm* — Beyer Law Group LLP

(57) ABSTRACT

Cyber security events are detected at modules on a vehicle and are passed to a cyber security platform. A generative AI model generates a natural language summary of each event and then groups these events based upon the natural language summaries. The model produces a natural language summary for each group. Groups are linked together based upon their natural language summaries and the model produces a natural language summary for each set of linked groups. The model attempts to match the summary of each set of linked groups to incident cases in a threat knowledge database; a match generates an incident alert. A partial match generates an early warning indicating which group of events is not present in the set of linked groups. No matching to any incident alert may also occur in which case no alert is output thus reducing false positives. The AI model uses retrieval augmented generation.

15 Claims, 11 Drawing Sheets

Creation of Natural Language Summary For an Event

FIG. 5

Matching of Linked Groups Example

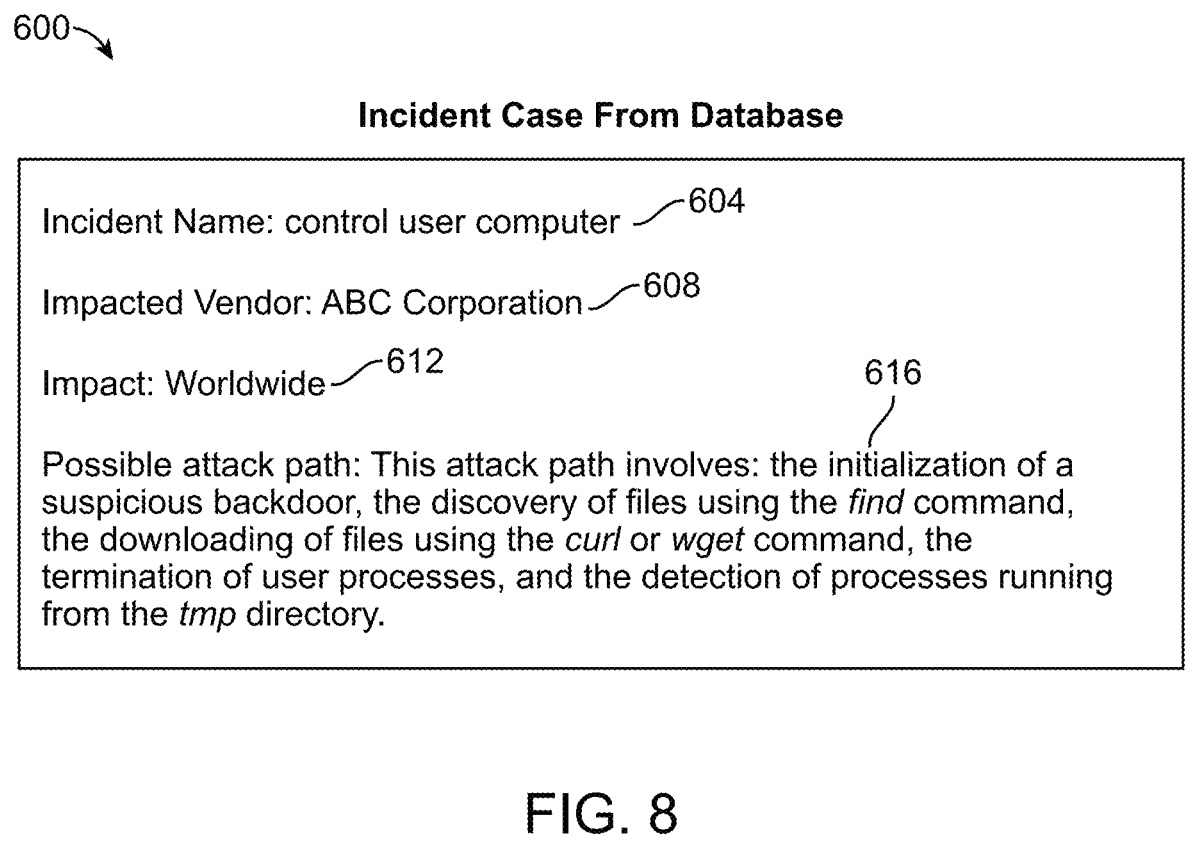

600

Incident Case From Database

Incident Name: control user computer ⟋604

Impacted Vendor: ABC Corporation ⟋608

Impact: Worldwide ⟋612

616

Possible attack path: This attack path involves: the initialization of a suspicious backdoor, the discovery of files using the *find* command, the downloading of files using the *curl* or *wget* command, the termination of user processes, and the detection of processes running from the *tmp* directory.

FIG. 8

Partial Matching of Linked Groups to Incident

Actual Incident case

Current detected Linked Groups

Lack of RF-status detected events

MALWARE DETECTION USING GENERATIVE ARTIFICIAL INTELLIGENCE AND THREAT KNOWLEDGE DATABASE

FIELD OF THE INVENTION

The present invention relates generally to the detection of malicious events in a computing environment. More specifically, the present invention relates to using artificial intelligence to identify the relevance between detected events and known malicious incidents.

BACKGROUND OF THE INVENTION

A connected vehicle can communicate with devices or systems that are external to the vehicle. Most new vehicles on the market today are connected in that they have components that can perform external communication by wireless or wired connection. A connected vehicle may also have sensors for receiving sensed data of its physical environment.

Connected vehicles typically have a plurality of electronic control units (ECUs) that perform various functions. For example, a connected vehicle may have an ECU for a central gateway, an ECU for in-vehicle information and entertainment, an ECU for engine management, etc. ECUs are computers with software and hardware components. More particularly, an ECU has a processor that executes software components, such as an operating system, application programs, and firmware.

Cyber security, within the context of connected vehicles, is the protection of automotive electronic systems, communication networks, control algorithms, software, users, and underlying data from malicious attacks, damage, unauthorized access, or manipulation. Connected vehicles are susceptible to cyber attacks, which include unauthorized intrusion, malware infection, etc. Unfortunately, traditional information technology (IT) cybersecurity measures are not readily adaptable to connected vehicles because a typical ECU is not as powerful as computers employed in the general IT environment. Furthermore, connected vehicles have different attack surfaces than general IT environments.

For instance, even though detection logs of suspect events (perhaps indicating a cyber attack) are produced continuously from the ECUs and other locations within the vehicle, it can prove difficult to sort through the large quantity of suspect events in order to generate actionable alerts that are not false positives. Current techniques rely upon determining the similarity of detected suspect events using techniques such as text embedding, TLSH, and other algorithms. De-duplication can then be used to remove certain similar events; however, a significant human effort is still needed to investigate similar events, provide a category, and finally provide feedback in the form of related incident cases that may indicate actual malware.

Unfortunately, the current techniques result in too many false positives (i.e., a high FPR), leading to inactionable alerts and alert fatigue on the part of human operators and other recipients. Accordingly, an improved system and methods are desirable.

SUMMARY OF THE INVENTION

To achieve the foregoing, and in accordance with the purpose of the present invention, a technique is disclosed that uses generative artificial intelligence in order to match detected suspect events with known incidents in a threat knowledge database.

In general, the invention is able to group similar detected events into groups, to link related groups, and then to match sets of linked groups to one or more actual incidents in a threat knowledge database, in order to output actionable alerts having a low false-positive rate.

In a first embodiment, events are placed into groups, groups are placed into sets of linked groups based upon similarities between natural language summaries of the groups, a natural language summary of one of the sets of linked groups is matched to a natural language incident case in a threat database, and an incident alert for a vehicle is output based upon the incident case.

In a second embodiment, events are placed into groups, groups are placed into sets of linked groups based upon similarities between natural language summaries of the groups, a natural language summary of one of the sets of linked groups is partially matched to a natural language incident case in a threat database, and an early warning for a vehicle is output based upon the incident case.

In a third embodiment, events are placed into groups, groups are placed into sets of linked groups based upon similarities between natural language summaries of the groups, a natural language summary of one of the sets of linked groups is attempted to be matched to natural language incident cases in a threat database, and no alert for a vehicle is output based upon the attempted matching.

These and other features of the present disclosure will be readily apparent to persons of ordinary skill in the art upon reading the entirety of this disclosure, which includes the accompanying drawings and claims.

BRIEF DESCRIPTION OF THE DRAWINGS

The invention, together with further advantages thereof, may best be understood by reference to the following description taken in conjunction with the accompanying drawings in which:

FIG. 5 illustrates how a natural language summary of an event is created from a detection log.

FIG. 8 is a particular incident case from a threat knowledge database.

DETAILED DESCRIPTION OF THE INVENTION

As mentioned above, the present invention is applicable to detecting threats within a connected vehicle.

Figure 1:
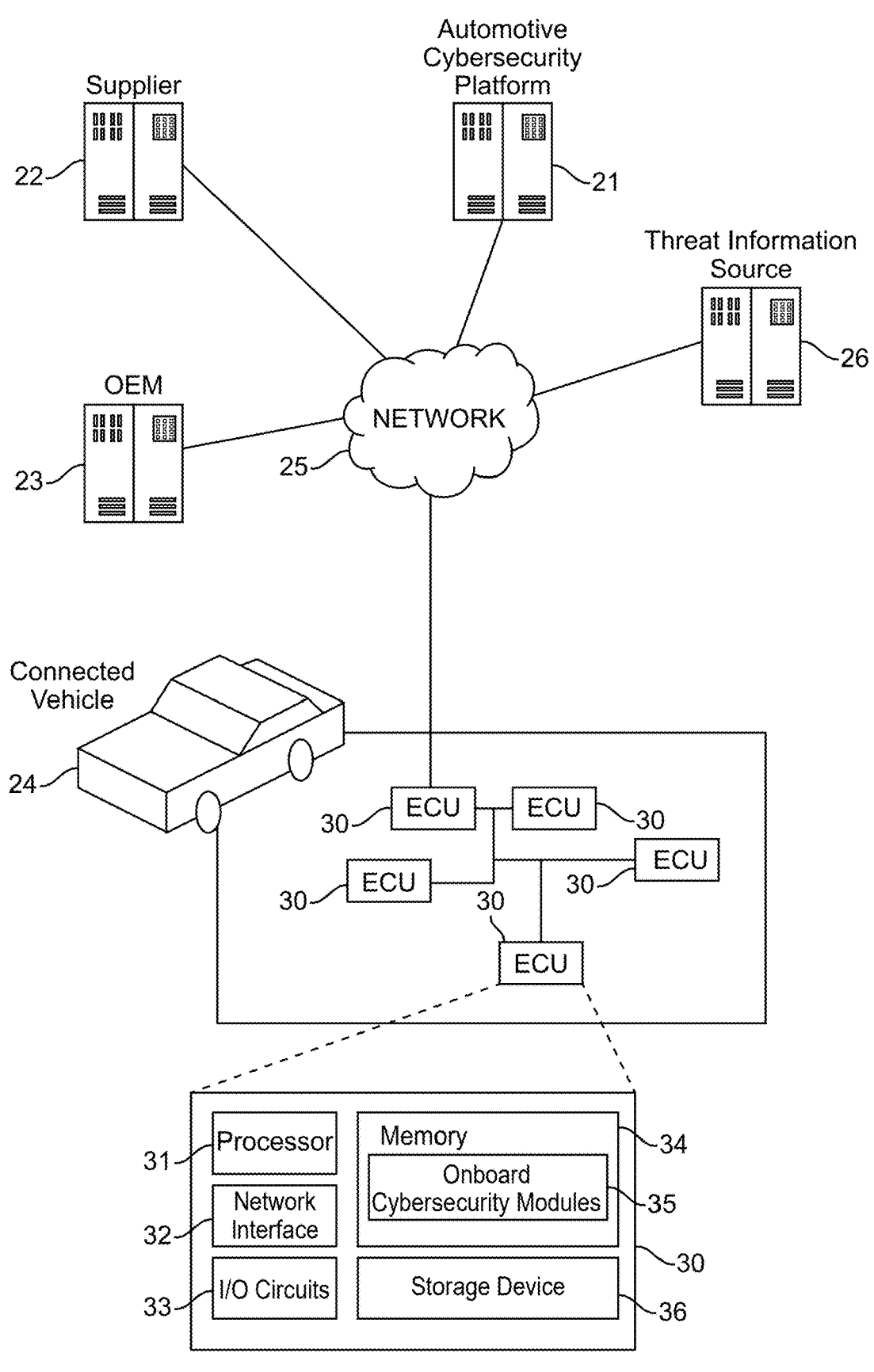
FIG. 1 shows a block diagram of a connected vehicle in accordance with an embodiment of the present invention.

FIG. 1 shows a block diagram of a connected vehicle 24 in accordance with an embodiment of the present invention. FIG. 1 shows a single connected vehicle 24, a single third-party supplier 22, and a single OEM 23 for illustration purposes only. As can be appreciated, there are many OEMs that manufacture connected vehicles that have components sourced from many, different third-party suppliers.

The connected vehicle 24 has a plurality of ECUs 30. An ECU 30 may be for engine management or onboard diagnostics (e.g., OBD II), may help implement a safety system, a body system, a chassis system, a power system, remote keyless entry, vehicle-to-everything (V2X) interfaces etc., and may also be referred to as a telematics control unit (TCU), an in-vehicle information and entertainment ("infotainment") (IVI) system, a central gateway, or a Global Navigation Satellite System (GNSS). One or more of the ECUs 30 and associated software components may be provided by the supplier 22 to the OEM 23, which is the manufacturer of the connected vehicle 24. The supplier 22 may provide firmware, source code, or other software components by removable storage media (e.g., Universal Serial Bus, flash storage) or over a communication network 25, which includes the Internet in this example. Each of the OEM 23 and the supplier 22 is depicted as a computer system to indicate that the OEM 23 and the supplier 22 may send and receive software components and communicate with the connected vehicle 24 over the network 25.

An ECU 30 is a computer comprising at least one processor 31, a memory 34, one or more network interfaces 32 for connecting to an internal or external communication network, and one or more input/output (I/O) circuits 33. An I/O circuit 33 may be a data acquisition and control circuit, a sensor interface, or other circuit for receiving data from external sources, such as data from other connected vehicles, sensed data of the environment outside the connected vehicle 24, etc. The memory 34 may be non-volatile memory (e.g., non-volatile random access memory "NVRAM") or volatile memory (e.g., dynamic random access memory "DRAM). Instructions of one or more onboard cybersecurity modules 35 and other software components of the ECU 30 may be stored in the memory 34 for execution by the processor 31. A storage device 36 may be a mass storage device, such as a solid-state drive (SSD). A particular ECU 30 may have fewer or greater components depending on the function of the ECU 30.

An ECU 30 may be connected to other ECUs 30 over an internal (i.e., in-vehicle) communication network, such an Ethernet network or a Controller Area Network (CAN) onboard the connected vehicle 24. An ECU 30 may communicate with external devices outside of the connected vehicle 24 by way of a V2X network, vehicle ad-hoc network (VANET), Wi-Fi, or other external communication network.

An automotive cyber security platform 21 may comprise a computer system with associated software for supporting cyber security procedures in one or more connected vehicles. The cyber security platform 21 may comprise at least one processor and a memory, with the memory storing instructions that when executed by the processor causes the cyber security platform to perform as described herein. The cyber security platform 21, which is external to the connected vehicle 24, may be implemented on a cloud computing platform (e.g., Amazon Web Services "AWS") or other computer system. The cyber security platform 21 may serve as a vehicle security operations center for the connected vehicle 24. The cyber security platform 21 may perform on-the-cloud, offboard (i.e., not on the connected vehicle 24)

cyber security procedures for the connected vehicle 24, such as offboard anomaly event detection and offboard correlation.

In the example of FIG. 1, the cyber security modules 35 may be generated at the cyber security platform 21 and provided to the connected vehicle 24 at the factory by the OEM 23, over the communication network 25, or by removable storage media (e.g., USB flash storage). The cyber security modules 35 are configured to perform cyber security procedures as described herein. The cyber security modules 35 are onboard in that they are deployed on the connected vehicle 24.

A threat information source 26 may comprise a computer system that provides common vulnerabilities and exposures (CVE) information, news of cyber threats, feedback from a bug bounty program, or other cyber threat intelligence. A vulnerability is a flaw or weakness in a software component (e.g., firmware, application program) or other component of an ECU. A vulnerability may be addressed directly with a patch that fixes the vulnerable component itself or indirectly with a virtual patch. Unlike a patch, a virtual patch does not fix the vulnerable component itself. Instead, the virtual patch monitors for and blocks an exploit from taking advantage of the vulnerability. Source 26 may include any number of threat knowledge databases that include case incidents that are descriptions of actual cyber attacks.

Figure 2:
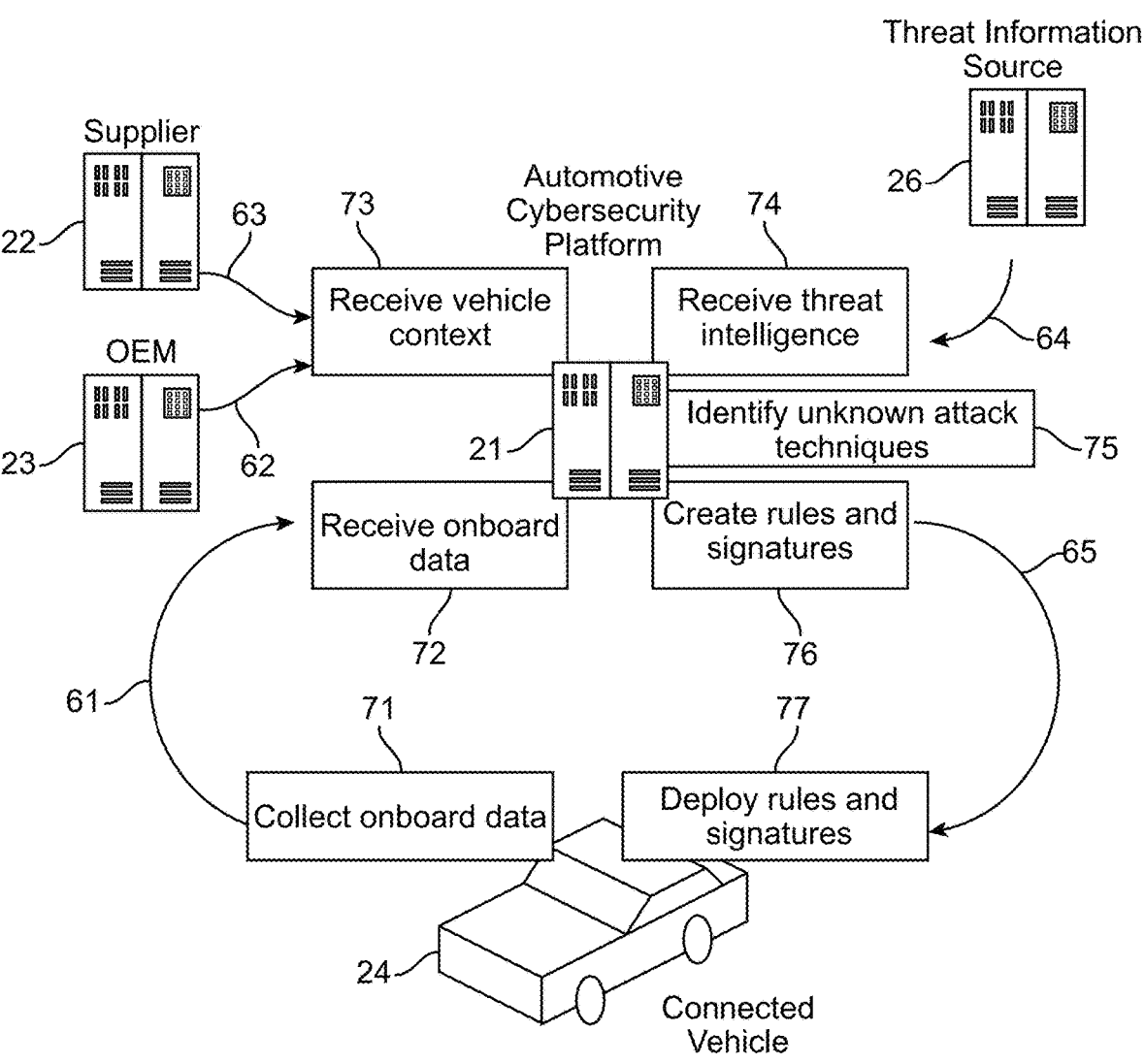
FIG. 2 shows a flow diagram of protecting the connected vehicle from cyber attacks.

FIG. 2 shows a flow diagram of protecting the connected vehicle 24 from cyber attacks. In the example of FIG. 2, one or more onboard cyber security modules collect onboard data (step 71) of the connected vehicle 24 and transmit the onboard data to the cyber security platform 21 (see arrow 61). Onboard data are data detected in the connected vehicle 24, including network traffic on internal communication networks, CAN messages, sensor data, vehicle signals, data in ECUs, etc. The onboard data are received in the cyber security platform 21 (step 72). Typically, this onboard data is in the form of detection logs collected in the ECUs, and in other cyber security modules such as in-vehicle anomaly detectors, a network intrusion detector or a rule-based IDPS detector.

The cyber security platform 21 further receives vehicle context (step 73) from the OEM 173 (see arrow 62) and the supplier 22 (see arrow 63). Vehicle context includes information on the design and components of the connected vehicle 24, including a software bill of materials (SBOM) of software components, ECU versions and makes, etc. The cyber security platform further receives threat intelligence (step 74) from the threat information source 176 (see arrow 64) which may include case incidents from a threat knowledge database.

In the cyber security platform 21, onboard data from the connected vehicle 24, vehicle context, and threat intelligence are analyzed to identify one or more unknown cyber attacks (step 75). As its name indicates, an unknown attack is previously unknown to cyber security researchers. Once identified, an incident alert may be generated.

Cyber security researchers may also create a rule for preventing the (now known) attack or an attack signature for detecting the attack (step 76). For example, cyber security researchers may analyze the onboard data, vehicle context, and threat intelligence to identify the cyber attack, identify features and patterns of the attack, and create corresponding rules and attack signatures. Rules and attack signatures generated in the cyber security platform 21 are provided to the connected vehicle 24 (see arrow 65). In the connected vehicle 24, the rules and attack signatures are deployed (step 77) by incorporating them in corresponding onboard rule-based and signature-based modules. Connected vehicle 24 is protected by a distributed cyber security framework in that cyber security procedures are distributed between the connected vehicle 24 and the cyber security platform 21.

Overview of Detection Method Using Generative Artificial Intelligence

Figure 3:
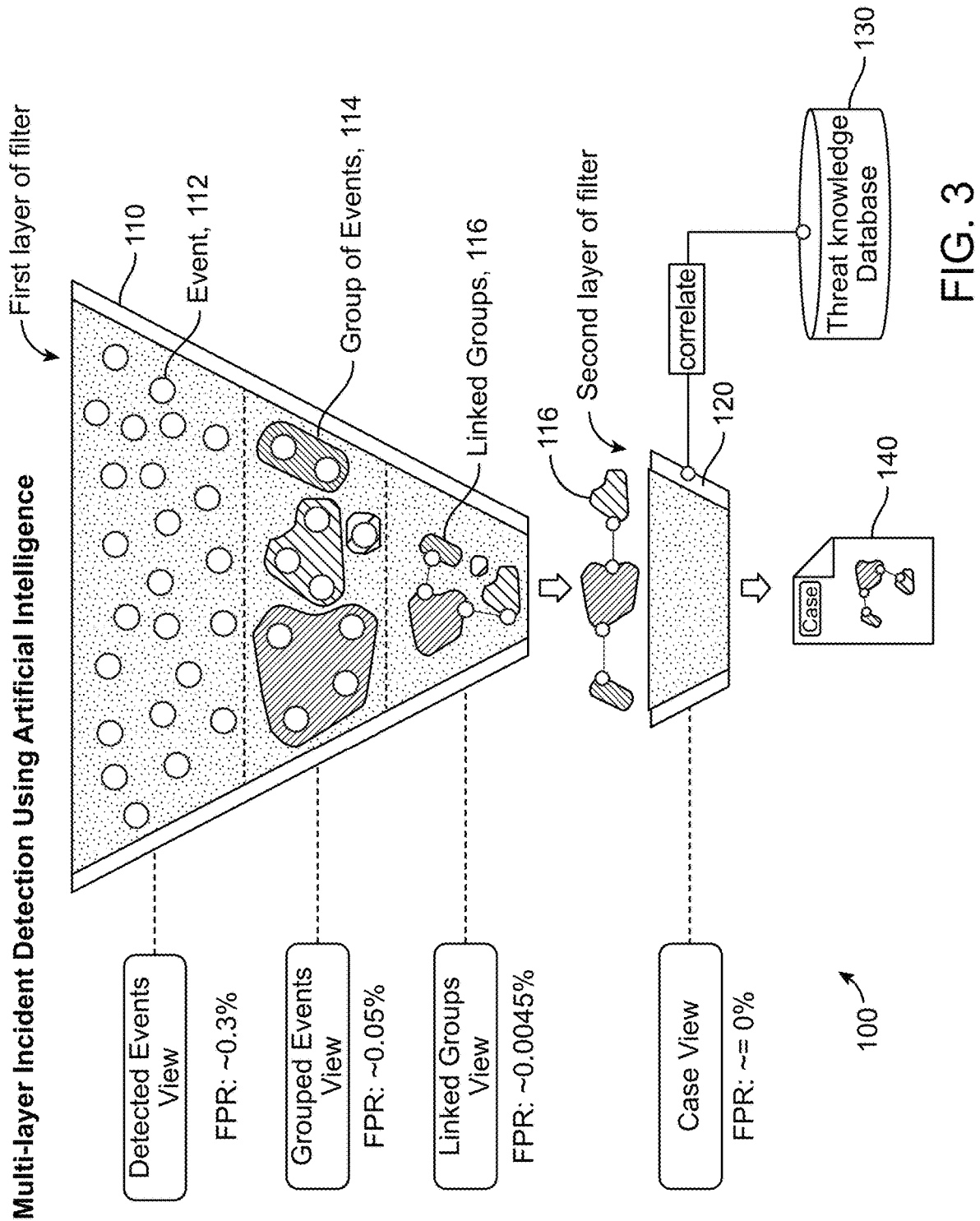
FIG. 3 is a diagram illustrating how multi-layer incident detection is performed using artificial intelligence.

FIG. 3 is a diagram illustrating how multi-layer incident detection is performed using artificial intelligence. Shown is a first layer filter 110 that includes any number of detected events 112 that may be collected from detection logs of the connected vehicle. Preferably, generative artificial intelligence summarizes each event in natural language leading to an overall false-positive rate of approximately 0.3%. These summaries of events are collected into groups of events 114 (sharing similar attributes or patterns) and again artificial intelligence summarizes each group, leading to an overall false-positive rate of approximately 0.05%. These groups may then be linked into linked groups 116 (based upon their summaries) leading to an overall false-positive rate of approximately 0.0045%. A natural language summary of each set is also generated.

Next, a particular set of linked groups 116 are correlated (or matched) to actual incident cases in a threat knowledge database 130 in order to produce an incident case 140 that likely represents malware now present within the connected vehicle that has been responsible for the detected events 112.

Figure 4:
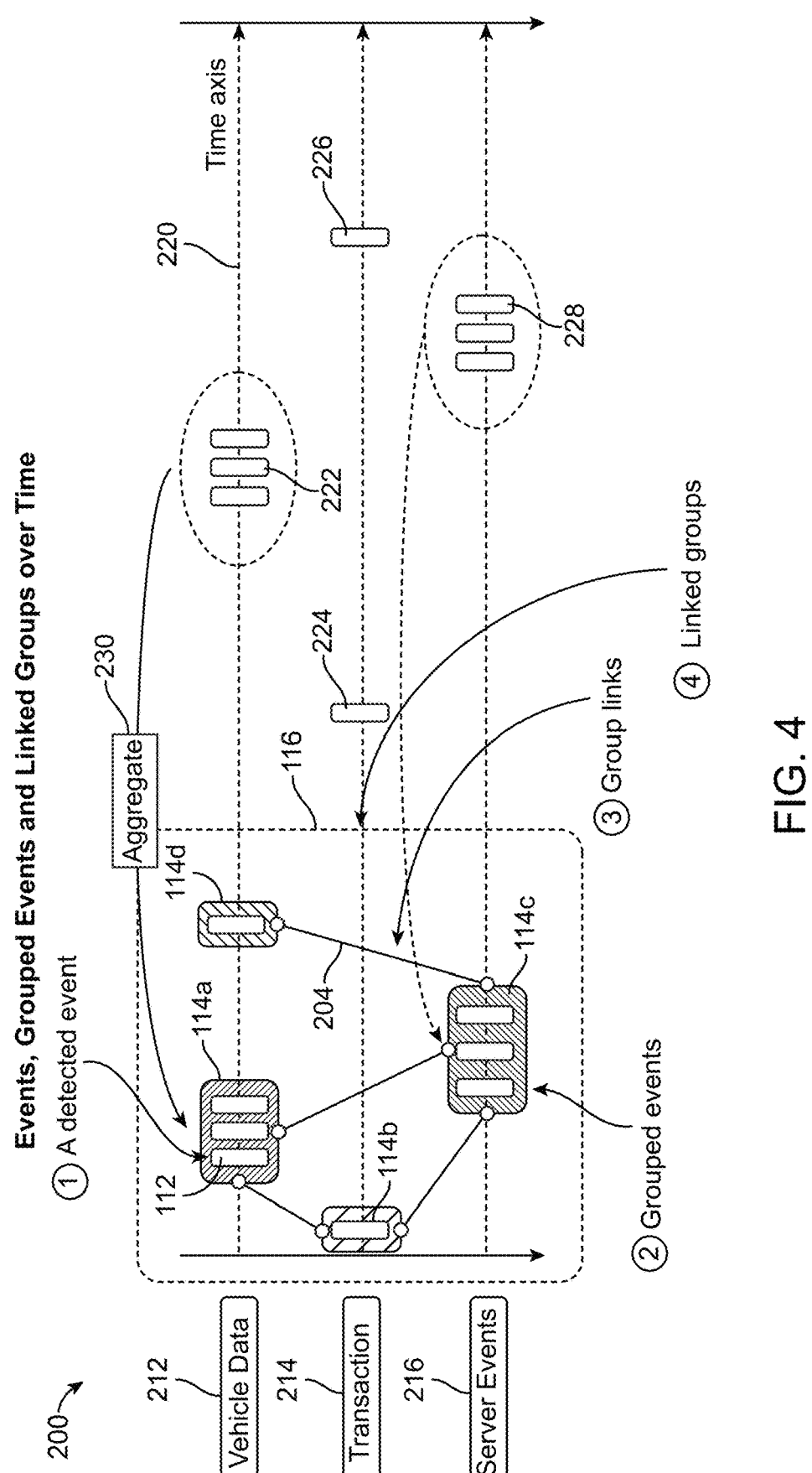
FIG. 4 is a diagram showing events, group events and linked groups over time.

FIG. 4 is a diagram showing events, group events and linked groups over time. Shown are numerous events 112 collected into any number of groups of events 114*a*, 114*b*, 114*c* and 114*d*, all of these groups of events being formed into a single linked group 116 and using links 204 between the groups. As can be seen, these events include vehicle data events 212, transaction events 214 and server events 216, and all of these events may occur at its different times. Further, time axis 220 shows at a later time that events 222, 226 and 228 may occur that are not present within the set of linked groups 116. Nevertheless, an aggregation technique 230 may be used to aggregate events 222 with events 112 all together within group 114*a*. Such an aggregation technique may take into account the amount of time elapsed from events 112 until events 222, may take into account the similarities between events 112 and events 222, and may group events 222 with events 112 using the same analysis used to group all of events 112 into group 114*a* as described in greater detail below. For example, if events 222 would normally be grouped with events 112 except that events 222 occurred 30 seconds later, the aggregation technique may dictate that all similar events occurring in vehicle data 212 within 60 seconds (or other maximum threshold) shall be grouped together.

Figure 5:
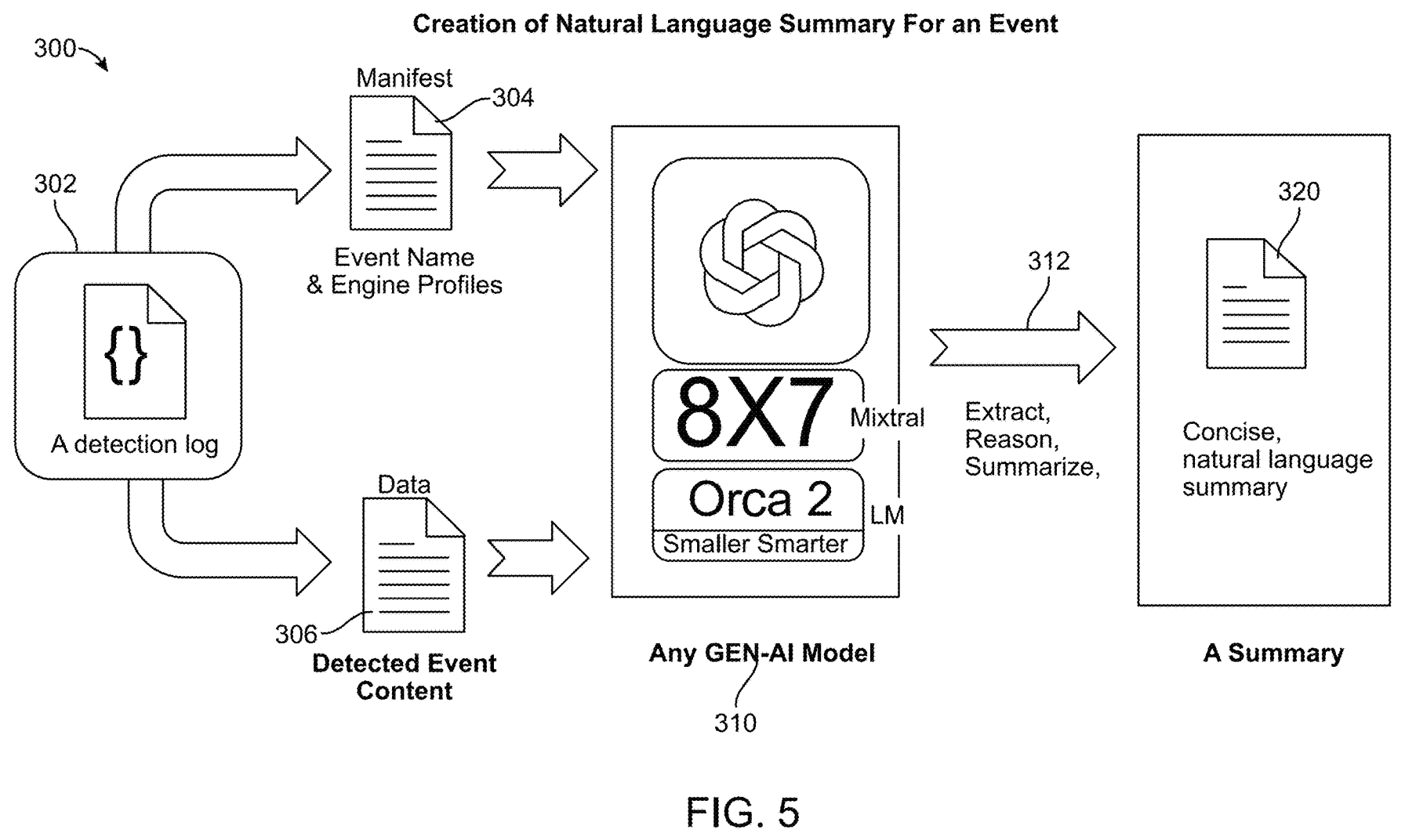

FIG. 5 illustrates how a natural language summary of an event is created from a detection log. A detection log 302 is received from a connected vehicle and for each suspect event a generative AI model extracts particular information such as event name and engine profiles 304 and the event content 306. The generative model 310 may be any of a wide variety of generative AI models including language models and large language models such as ChatGPT from Open AI, Mixtral 8×7, Orca 2, etc. Upon input of the raw event information 304, 306 the generative AI model produces a concise natural language summary of the event 320 as requested. As shown, typically a detection log 302 consists of a manifest 303 and data 306, although logs may take other forms. A prompt for the model 310 may be "Provide a concise summary of this input detection log (including the manifest and data)."

Figure 6:
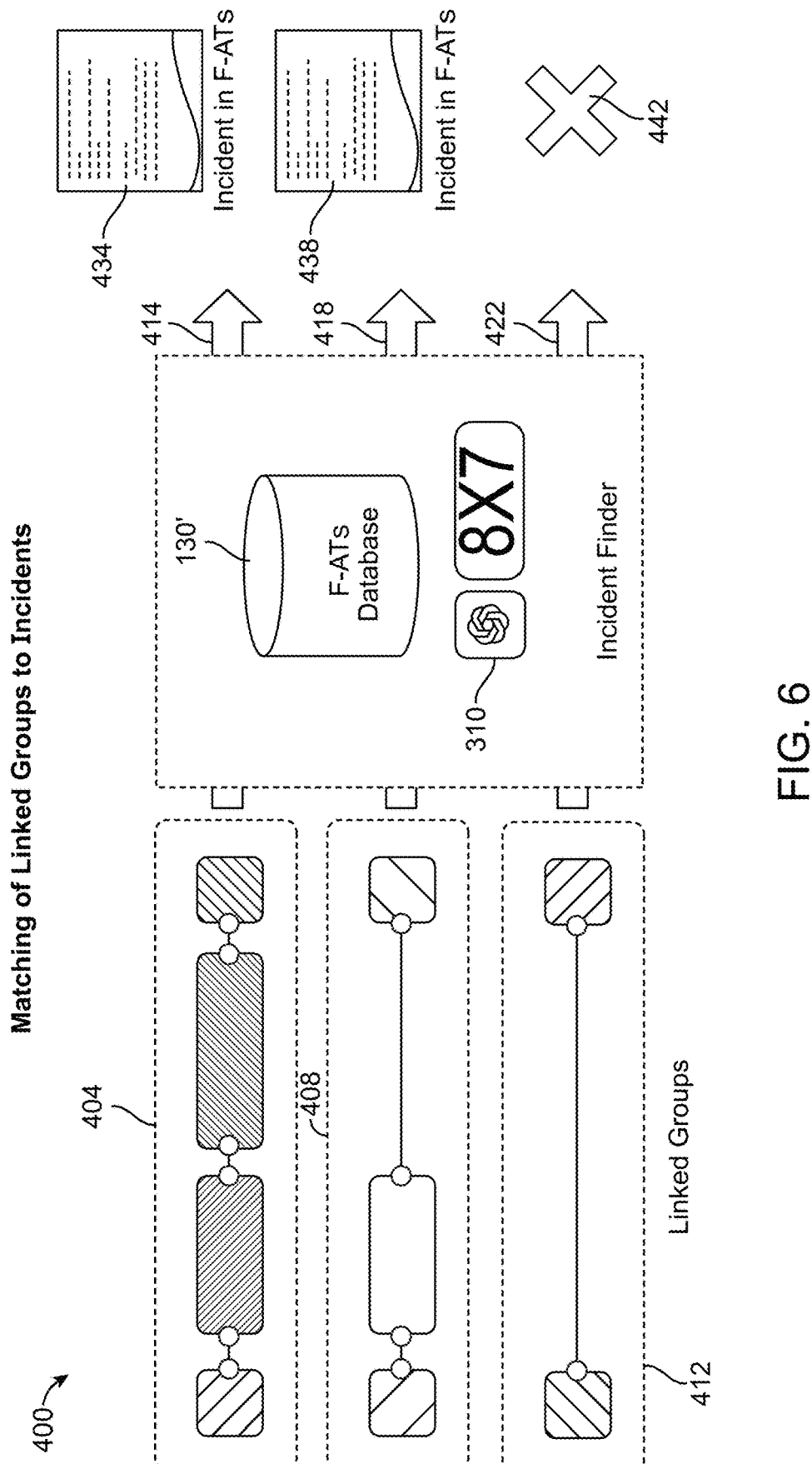
FIG. 6 illustrates the matching of sets of linked groups to incidents in a threat intelligence database

FIG. 6 illustrates the matching of sets of linked groups to incidents in a threat intelligence database. Shown are any number of sets of linked groups of events 404, 408 and 412, that are each matched against incidents in the threat intelligence database using any of the generative artificial intelligence models. In this example, database 130' is a foresight actionable TTP (tactic, technique, procedure) strategic (F-ATs) database that includes any number of case incidents, the F-ATs database being an implementation of a threat knowledge database in the automotive field. An incident is matched in the database only when it matches a particular set of linked groups. By way of example, 414 indicates that linked groups 404 have matched incident 434 in the database, 418 indicates that linked groups 408 have matched incident 438 in the database, but arrow 422 indicates that linked groups 412 have not matched 442 any incidents in the database and no alert will be generated. Only 434 and 438 will generate an incident alert.

By only generating an incident alert when a set of linked groups matches incident, this ensures low false-positive incident detection, offering a comprehensive conclusion including actionable mitigations based upon the matched incident.

Figure 7:
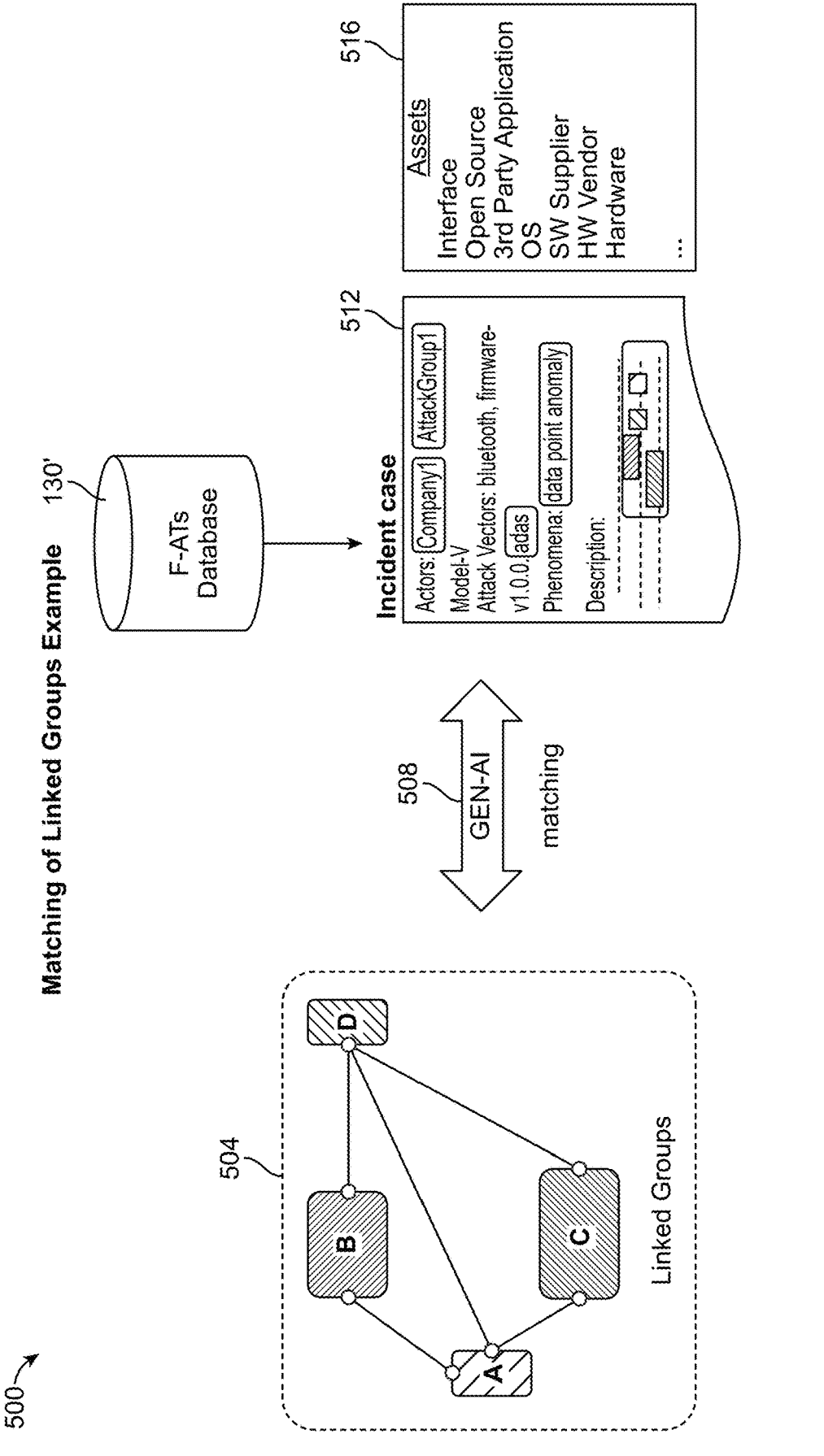
FIG. 7 is a more detailed example of matching linked groups to incidents.

FIG. 7 is a more detailed example of matching linked groups to incidents. Shown is a particular set of linked groups A, B, C and D, showing that there may be any number of groups of events linked together, each group being linked with one or more of the other groups in the set. As above, a generative AI model 508 attempts to match these linked groups 504 with incidents in the database 130', resulting in a matched incident case 512 which lists specifically the bad actors, the attack vectors used, any particular phenomena, and a description of the incident.

Asset list 516 refers to the descriptions of the components of the vehicle in which events have been detected and which events are present within linked group 504. Descriptions of these components may be found in a TARA analysis report of the vehicle or in the vehicle EEA (electrical and electronic architecture). These descriptions are used to assist in determining whether the various incident cases found during matching 508 do match the actual hardware and software configuration of the vehicle, thereby reducing mismatching in incident cases. For example, if an event within a group of events B of 504 comes from an abnormal detection log of Bluetooth activity, and the incident case found describes an incident unrelated to Bluetooth activity, the asset list 516 of the vehicle can be used to exclude this mismatched incident case, thus reducing false positives.

FIG. 8 is a particular incident case from a threat knowledge database. This incident case includes the incident name 604, the impacted vendor 608, the impact 612 of the incident, and a natural language description of the possible attack path 616.

Figure 9:
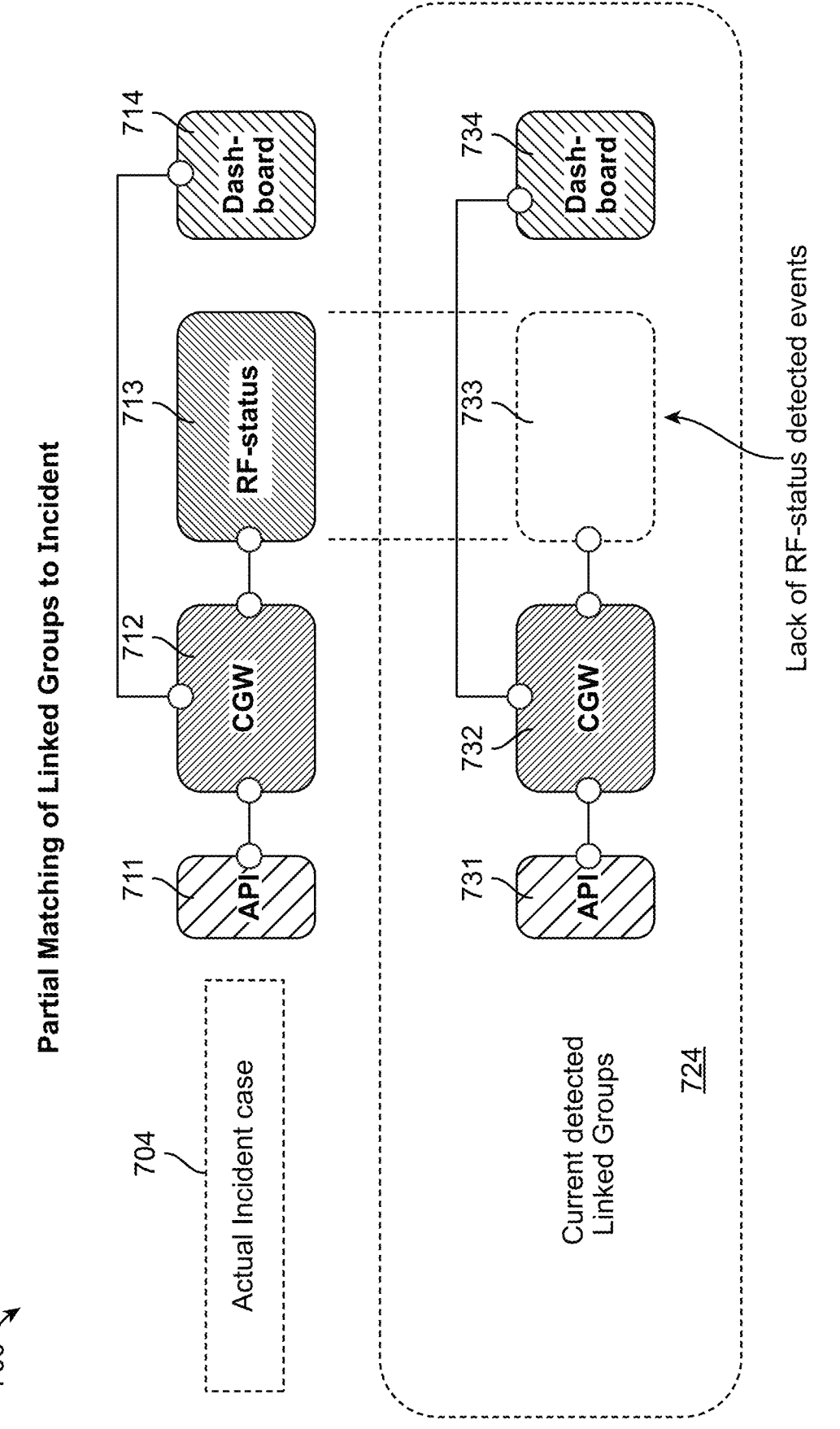
FIG. 9 illustrates partial matching of linked groups to an incident in a threat knowledge database.

FIG. 9 illustrates partial matching of linked groups to an incident in a threat knowledge database. It is possible that a currently detected set of linked groups 724 does not completely match an actual incident case in a threat knowledge database. For example, linked groups 724 includes a group 731 (having API-related events), a group 732 (having CGW-related events), and a group 734 having events related to the dashboard of vehicle. As can be seen, each of these groups match corresponding groups 711, 712 and 714 in the actual incident case 704 except that there is no RF-status group 713 in the currently detected set of linked groups. Nevertheless, knowing that the linked groups partially align with an actual incident case in the database, the system can generate an early warning (indicating that malware may be present) and can provide information about the missing groups of the events (i.e., information about possible suspect events occurring related to RF status 713).

Flow Diagram for Generating Incident Alerts

Figure 10:
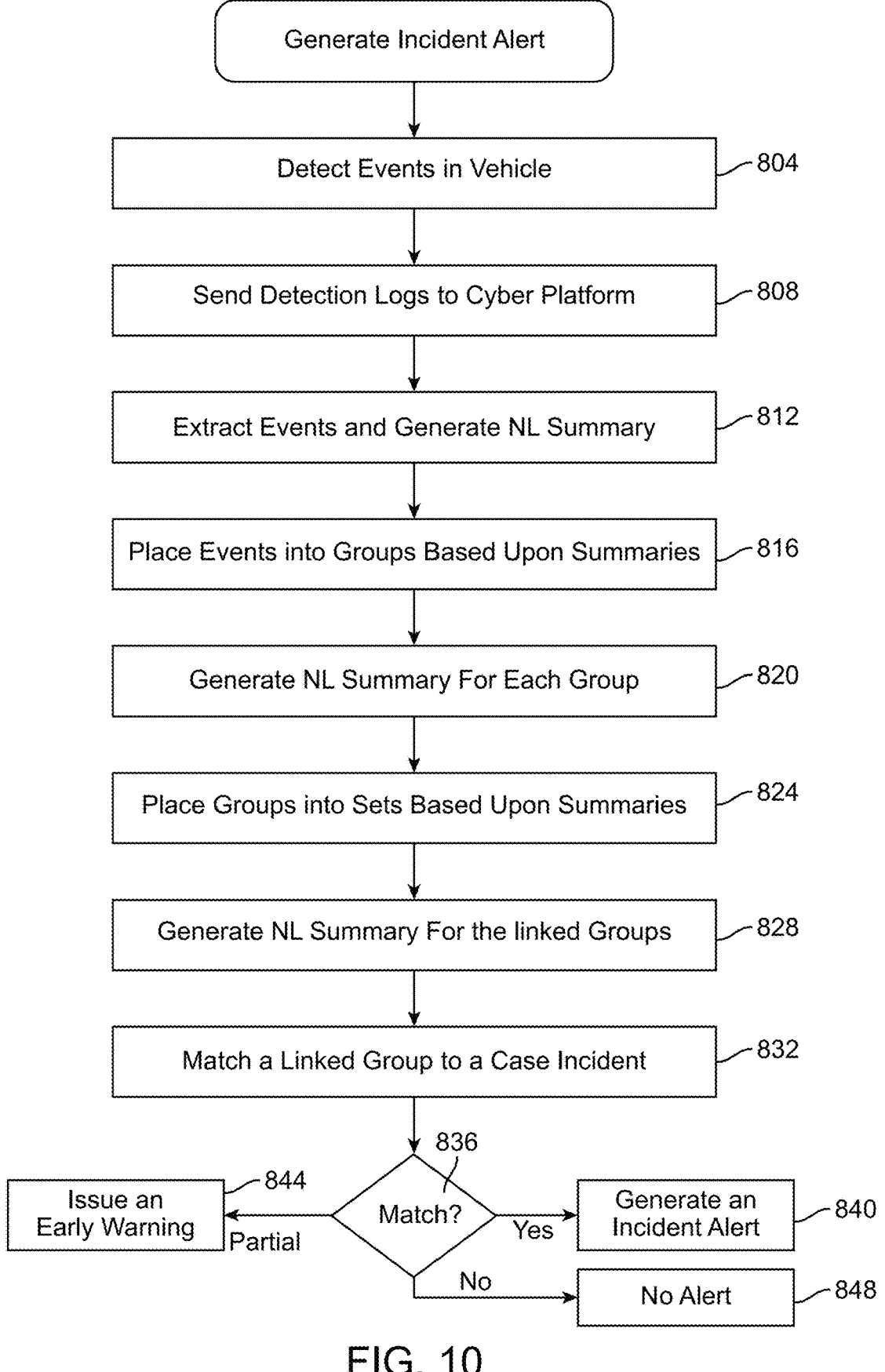
FIG. 10 is a flow diagram describing how events are detected within a connected vehicle and how actionable incident alerts are generated.

FIG. 10 is a flow diagram describing how events are detected within a connected vehicle and how actionable incident alerts are generated.

In a first step 804, any number of cyber security-related events are detected in a connected vehicle 24. These events may be detected in any number of detection engines throughout the vehicle, including in any ECUs, and in other cyber security modules such as in-vehicle anomaly detectors, a network intrusion detector or a rule-based IDPS detector, and may originate in any of the number of diverse data sources (e.g. vehicle data, transaction data, server data, etc.). Typically, these events are recorded in detection logs which may be stored within the vehicle itself are transmitted from the vehicle. Events include suspect computer-related activities such as: malicious CAN bus message by frequency model, WEB GNU bash remote code execution shellshock, etc. In a next step 808 all of these detected events (typically as detection logs) are sent from vehicle 24 to an automotive cyber security platform 21 such as is shown in FIG. 2. These detection logs may be sent periodically such as being sent every 60 seconds, every five minutes, or over longer or lesser frequency.

Next, in step 812 the detection logs are input into a generative AI model from which it extracts the essential information for each event such as its manifest (including event name and engine profiles) and its data behaviors from its content, such as is shown in FIG. 5. The AI model will also generate a natural language summary for each event that will assist in placing events into groups in the next step. The AI model may be given a suitable prompt such as "From this input of detection logs from a vehicle, extract the essential information for each recorded event and produce a concise natural language summary for each event."

An example of a natural language summary of an event generated by the AI model may be: "On Jun. 21, 2024 at 12:34:09, a low severity CAN_BUS_ANOMALY_EVENT was detected by Model 5 ECU device. The log shows a malicious CAN bus message detected by an unseen model. The highlighted objects show that there were four newly observed CANIDs, which are flagged as part of the malicious message. The CANIDs are: 910, 9F0, 9CF, and 818, all on Bus 1. The event was detected by TMIS Sensor/2.0.999 and occurred on vm-ubuntu-hostname. The endpoint GUID is 1b931368-26safac130002 and the customer identifier is ccd36ca7-4xxx-1232."

Next, in step 816, the events are placed into groups based upon the natural language summary of each event, such as is shown at 114, 114*a-d*, and groups A, B, C and D of 504. Basically, events may be grouped based upon having similar attributes or patterns. By way of example, events may be placed into the same group if these events: are triggered from the same detection module or engine; have the same source IP address; have the same connection direction; have the same or similar data payload; or have occurred within the same time slot.

Various techniques may be used to place events into groups including using a generative AI model. A particular technique known as retrieval-augmented generation (RAG)

may be used with a generative AI model to group events and to link groups as described below. RAG is a framework or approach that combines external information retrieval systems with generative AI models to enhance the generation process. In RAG, the retrieval component and the generative AI model are typically separate entities that work together. The retrieval component is an external system or module that searches for and retrieves relevant information from a predefined corpus or database. The generative AI model is separate AI model (e.g., ChatGPT) that generates responses using the information provided by the retrieval component. The retrieval component fetches relevant data, which is then passed to the generative AI model to inform its output. This collaboration between retrieval and generation systems makes RAG a hybrid approach.

For example, RAG utilizes a generative AI model to place similar events into the same group. In this technique, the AI model inputs the natural language summaries and calculates similarities between the events. Internally, the AI model transforms each summary into numbers and then calculates the distance between summaries based upon these numbers: the smaller the distance, the more similar the two summaries, or rather, the more similar the events represented by the summaries. In the implementation of the RAG, a simple threshold can be pre-set (e.g. top-K similar) or more delicate algorithms can be used if necessary.

RAG uses models to retrieve relevant information (i.e. calculating the content similarity and identifying similar events in this case) and to generate the desired response. RAG for example, uses an embedding model to find the similarities and a generative model for the output response. For example, in RAG using a prompt such as "Find similar events to this (the event summary)", the AI model may respond "Events 1, 2, 3, 4, 5 are found to be similar because they all originate from the same detection module." Other algorithms may be used to group events (or to link groups) instead of or as supplementary methods along with RAG if needed. Thus, the techniques for grouping events and linking groups are design choices. Other similar techniques such as Bag of Words (BoW), Term Frequency-Inverse Document Frequency (TF-IDF), Latent Dirichlet Allocation (LDA) or calculating the distance between vectors that are converted with an Encoder-Decoder Based Language Model may also be used in conjunction with the retrieval component of RAG.

The AI model may be given a suitable prompt such as "Based upon these natural language summaries, please form groups of similar events." After these groups of events have been formed, then in step 820 the generative AI model generates a natural language summary for each group, providing an informative description best representing the events of that group.

The AI model does not need to be prompted to use a particular algorithm or RAG, but it can be prompted to do so with instructions on how to proceed if needed. For an RAG example, with a prompt such as "Find similar events to this (event) and give a descriptive summary for them as a group;" similar events are selected based on the similarities and then a suitable summary is generated for them.

Next, in step 824, the AI model places these groups into sets in order to form linked groups based upon the summaries of each of the groups generated in step 820. By way of example, linked groups are shown at 116 in FIGS. 3 and 4, at 404-412, at 504, and in the linked groups 731-734 of FIG. 9. A link between two groups of events represents the discovery of a relationship between the two and a single group may have links with one or more other groups of events. This relationship may be predefined or may be suggested by the generative AI model based upon the summaries of the groups. The generative AI model is thus asked to link groups based upon the similarities of each group found in the natural language summary of each group (or predefined), and these similarities may include: sharing the same component, affecting the same CANID, exhibiting similar patterns in time or in frequency, containing events sent from the same data source, events occurring with similar frequency, events occurring immediately afterwards one another, events relating to the same file objects, having a high correlation occurrence of events, events that affect the same ECU, or events that connect to the same IP address. In one example, two groups of events coming from different data sources (e.g. two different modules) may be linked if they have similar time or frequency characteristics. As above, a technique such as RAG or similar may be used to ask the AI model to place groups into sets of linked groups. With the RAG method, the AI model is prompted with question or a task such as "Are there any groups related to this (group summary)?"

In a set of linked groups, each group may be linked to one of the other groups in the sets, to many of the other groups, or to all of the groups in the set based upon the similarities. The AI model may be given a suitable prompt such as "Place groups of events into sets of linked groups based upon the summaries of the groups by identifying links (i.e. similarities) between groups." Accordingly, the AI model creates links between groups when these relationships are found and thus creates sets of linked groups, representing an observation of systemic behavior.

In a next step 828, the AI model generates a natural language summary for each of the linked groups by elaborating upon the behavioral observations of the groups in a set of linked groups, thus providing a comprehensive narrative for each set of linked groups that best describes its systemic attributes and behaviors.

In step 832 the system matches one or more of the linked groups to case incidents in a threat knowledge database, such as FATs database 130'. Such correlation or matching is shown symbolically at 120, at 414-422, at 508, and in FIG. 9. Above, step 828 has created a natural language summary of the characteristics and behaviors of an observed system, namely a set of linked groups. The AI model may use a technique such as RAG or similar in order to attempt to match the natural language summary of a linked group with any incidents in a threat knowledge base identifying the highly relevant matches. Accordingly, a linked group that matches a particular incident case in the database will share the same systemic characteristics and behaviors. For instance, a linked group and a case incident may share a sequence of behaviors such as discovering an authorized connection, followed by a file download and CAN flooding detections. The AI model may be given a suitable prompt such as "Given this natural language summary of this particular linked group, attempt to match this linked group with incident cases in the threat knowledge database," or, a prompt such as "Is there any FATS incident in the threat knowledge database related to this linked group [information of event group]?"

The model does not need to be told to use a particular approach (e.g. the RAG) to do the task. For example, if the RAG is chosen to use to match linked groups and incidents, the AI model can be prompted with a query like "Are there any FATS incident related to this linked group (linked group information)?" In the implementation of the RAG, a simple threshold can be pre-set (e.g. top-K similar) or more delicate algorithms can be used if necessary.

As an example, consider that the AI model has generated this natural language summary of a particular linked group from step 828:

1. Suspicious backdoor initialization: This attack path involves the initialization of a suspicious backdoor, detected by the rule "Suspicious backdoor initialization."
2. File Discovery via Find Command: This attack path involves the discovery of files using the find command, detected by the rule "File Discovery via Find Command."
3. Download Via Curl Or Wget: This attack path involves the download of files using the curl or wget command, detected by the rule "Download Via Curl Or Wget."
4. Kill User Process: This attack path involves the termination of user processes, detected by the rule "Kill User Process."
5. Processes Running Detected From Tmp Directory: This attack path involves the detection of processes running from the tmp directory, detected by the rule "Processes Running Detected From Tmp Directory."

Thus, in step 830 the AI model attempts to match this summary with any incidents in the threat knowledge database using RAG (or similar technique) (such as is shown in FIG. 6 or FIG. 7) and will match this summary with incident case 600 of FIG. 8. Because both the summary and the incident case are in natural language, the AI model is better able to compare and produce matches or partial matches using these above techniques.

In step 836 the AI model determines if it has a complete matter or a partial match. If a complete match, then in step 840 the AI model or other suitable software of the cyber security platform 21 generates an actionable incident alert which may be delivered 65 to the connected vehicle (or its operator) or to another entity such as supplier 22, OEM 23, etc. The alerts may be sent as alert event logs with essential information to a VSOC (vehicle security operation center, e.g. platform 21) platform to display on the console to VSOC users. There are various ways to set the matching criteria or to allow the AI model to suggest the match. One possible method is to ask the AI model to determine how many steps in the attack path of an incident are mentioned or discovered in the linked group summary. If most of these steps are described in the summary, the incident is deemed to be a match. Numerical thresholds may be used. As described above, descriptions in asset list 516 may be used to assist in determining whether the various incident cases found during matching do actually match the actual hardware and software configuration of the vehicle, thereby reducing mismatching in incident cases and reducing false positives or serving to confirm that a match is possible.

In step 836 it may be determined that a partial match has occurred such as shown in FIG. 9. In this situation, the AI model determines that although characteristics and behaviors of most (or all but one) of the groups of a particular set of linked groups have matched with an actual incident case in the threat knowledge base, there is one group of a particular incident case (such as group 713) for which there is no corresponding match in the currently detected set of linked groups 724. The AI model may be given a suitable prompt such as "Is there any incident case in the threat knowledge database that partially matches any of the linked groups? If so, please identify the incident case and provide a natural language summary of the behaviors and characteristics of a group of events missing from the linked group."

One possible method is to ask the AI model to determine how many steps in the attack path of an incident are mentioned or discovered in the linked group summary. If a portion of these steps, such as half, are described in the summary, the incident is deemed a partial match. Other numerical thresholds may be used.

Once this output of the characteristics of a group of events missing from the linked group is obtained, an early warning may be generated and sent to any of the above parties describing the possible incident case that has occurred in the connected vehicle and the characteristics of events that have not occurred yet. The alerts are sent as early warning event logs with essential information to the VSOC (vehicle security operation center) platform 21 to display on the console to VSOC users.

Of course, it is also entirely possible that there will be no match in step 836 and that therefore in step 848 no incident alert will be generated, thus reducing the number of false positives, inactionable alerts and reducing alert fatigue.

Accordingly, if in step 836 the generative AI model determines that there is no suitable match in the threat knowledge database to any relevant incident alert, then in step 848 no alert is generated. No alert in step 848 may take the form of nothing at all being output from the cyber security platform, may take the form of a simple output to any of the above entities indicating that no threat was found or may take another form such as the AI model outputs a particular string (e.g. "NOT FOUND") and triggering no output event to the platform.

Computer System Embodiment

Figures 11A, 11B:
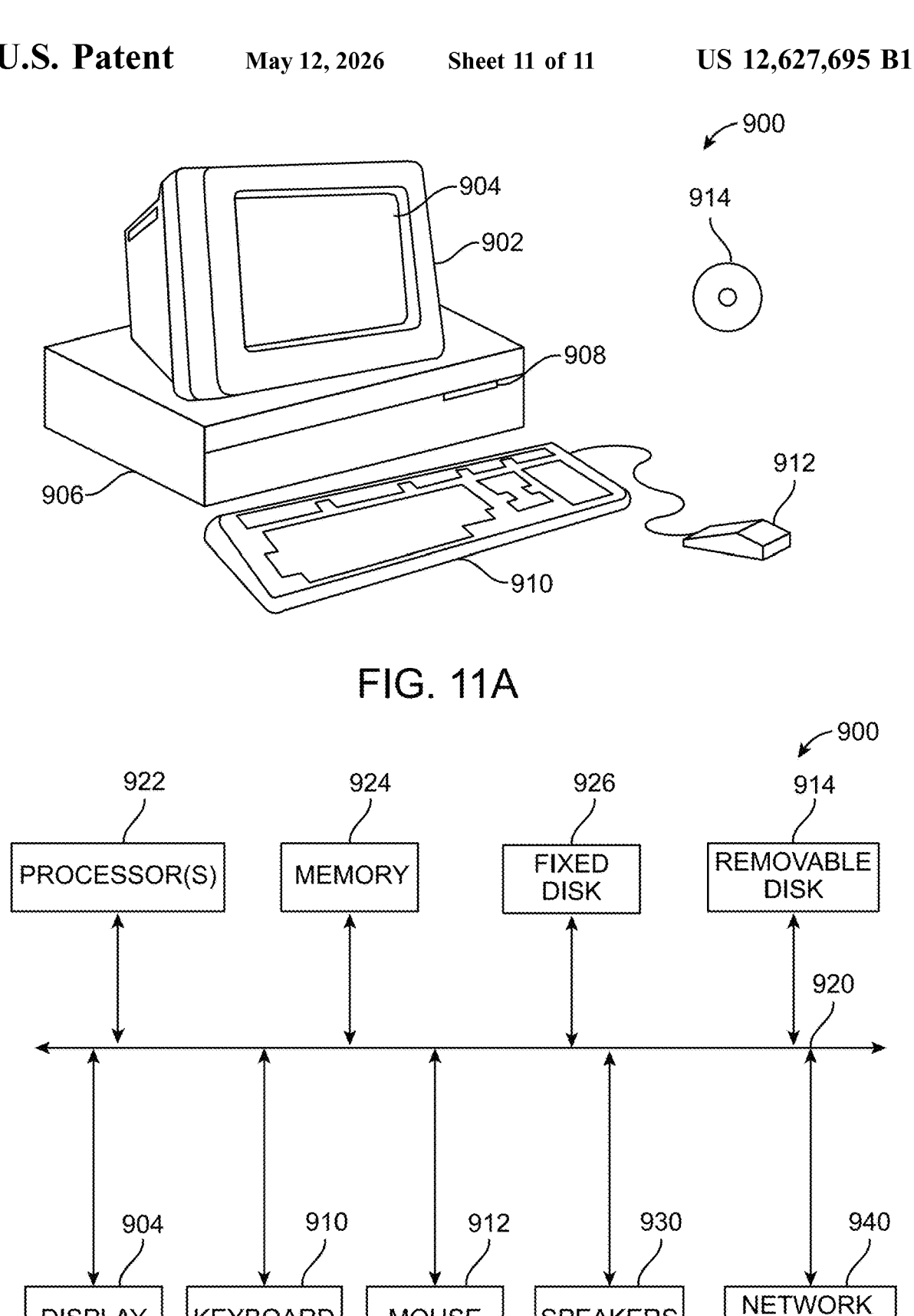
FIGS. 11A and 11B are a block diagrams illustrating a computing environment for use in any of the embodiments.

FIGS. 11A and 11B illustrate a computer system 900 suitable for implementing embodiments of the present invention. FIG. 11A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 11B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of generating a cyber security early warning, said method comprising:

inputting, into a generative AI model, a plurality of cyber security events originating at a vehicle and generating a natural language summary of each event;

placing said events into groups based upon similarities between said natural language summaries of said events and generating a natural language summary of each group;

placing said groups into sets of linked groups based upon similarities between said natural language summaries of said groups and generating a natural language summary of each set of linked groups;

partially matching a natural language summary of one of said sets of linked groups to a natural language incident case in a threat database, wherein said incident case includes a group of related events that does not match one of said groups in said one of said sets of linked groups; and outputting an early warning for said vehicle based upon said incident case, thereby improving operation of a cybersecurity system by enabling early identification of malware activity while suppressing generation of false-positive malware detection alerts.

2. The method as recited in claim 1 further comprising:

using said generative AI model to perform said placing said events, said placing said groups, and said matching.

3. The method as recited in claim 2 wherein said generative AI model uses retrieval augmented generation (RAG) to perform said placing said events, said placing said groups and said partially matching.

4. The method as recited in claim 1 wherein said cyber security events are in detection logs obtained from cyber security modules of said vehicle.

5. The method as recited in claim 1 wherein said placing said groups is performed based upon predefined similarities are based upon similarities suggested by said generative AI model.

6. The method as recited in claim 1 wherein said output early warning includes a natural language summary of said incident case indicating that said group of related events is not present in said vehicle.

7. The method as recited in claim 1 wherein said placing said events into groups further comprises:

aggregating cyber security events from the same source that occur at different times.

8. The method as recited in claim 1 wherein said plurality of cyber security events are occurring at the vehicle, and wherein said placing steps, said partially matching, and said outputting are performed in response to occurrence of said plurality of cyber security events.

9. A method of not generating a cyber security incident alert, said method comprising:

inputting, into a generative AI model, a plurality of cyber security events originating at a vehicle and generating a natural language summary of each event;

placing said events into groups based upon similarities between said natural language summaries of said events and generating a natural language summary of each group;

placing said groups into sets of linked groups based upon similarities between said natural language summaries of said groups and generating a natural language summary of each set of linked groups;

attempting to match a natural language summary of one of said sets of linked groups to natural language incident cases in a threat database;

determining that none of said sets of linked groups matches any incident cases in said threat database; and outputting an indication in response to said determining that said cyber security events of said vehicle do not match any incident cases in said threat database, thereby improving operation of a cybersecurity system by suppressing generation of false-positive malware detection alerts.

10. The method as recited in claim 9 further comprising:

using said generative AI model to perform said placing said events, said placing said groups, and said matching.

11. The method as recited in claim 10 wherein said generative AI model uses retrieval augmented generation (RAG) to perform said placing said events, said placing said groups and said attempting to match.

12. The method as recited in claim 9 wherein said cyber security events are in detection logs obtained from cyber security modules of said vehicle.

13. The method as recited in claim 9 wherein said placing said groups is performed based upon predefined similarities are based upon similarities suggested by said generative AI model.

14. The method as recited in claim 9 wherein said attempting uses an asset list of components of said vehicle to determine that said cyber security events of said vehicle do not match any incident cases in said threat database.

15. The method as recited in claim 9 wherein said plurality of cyber security events are occurring at the vehicle, and wherein said placing steps, said attempting to match, said determining, and said outputting are performed in response to occurrence of said plurality of cyber security events.

* * * * *